(12) United States Patent
Tuli (10) Patent No.: US 6,928,461 B2
(45) Date of Patent: Aug. 9, 2005

(54) PORTABLE HIGH SPEED INTERNET ACCESS DEVICE WITH ENCRYPTION

(76) Inventor: Raja Singh Tuli, 1155 Rene Levesque West, Suite 3500 Montreal, Quebec H3B 3T6 (CA)

( * ) Notice: Subject to any disclaimer, the term of this patent is extended or adjusted under 35 U.S.C. 154(b) by 1016 days.

(21) Appl. No.: 09/768,135

(22) Filed: Jan. 24, 2001

(65) Prior Publication Data

US 2002/0099766 A1 Jul. 25, 2002

(51) Int. Cl.$^7$ ............................................. G06F 15/16
(52) U.S. Cl. ..................... 709/203; 705/14; 707/523; 715/500.1; 345/173; 345/744; 455/72
(58) Field of Search ........................ 709/203; 705/14; 707/523; 715/500.1; 345/173, 744; 455/72

(56) References Cited

U.S. PATENT DOCUMENTS

| | | |
|---|---|---|
| 4,899,394 A | 2/1990 | Lee |
| 5,161,213 A | 11/1992 | Knowlton |
| 5,355,447 A | 10/1994 | Knowlton |
| 5,444,763 A | 8/1995 | Lazaridis et al. |
| 5,534,893 A | 7/1996 | Hansen, Jr. et al. |
| 5,546,524 A | 8/1996 | Chow et al. |
| 5,555,241 A | 9/1996 | Lazaridis et al. |
| 5,559,800 A | 9/1996 | Mousseau et al. |
| 5,600,790 A | 2/1997 | Barnstijn et al. |
| 5,657,345 A | 8/1997 | Lazaridis |
| 5,682,525 A | 10/1997 | Bouve et al. |
| 5,699,255 A | 12/1997 | Ellis et al. |
| 5,701,451 A | 12/1997 | Rogers et al. |
| 5,721,908 A | 2/1998 | Lagarde et al. |
| 5,727,159 A | 3/1998 | Kikinis |
| 5,758,110 A | 5/1998 | Boss et al. |
| 5,761,663 A | 6/1998 | Lagarde et al. |
| 5,764,235 A | 6/1998 | Hunt et al. |
| 5,765,176 A | 6/1998 | Bloomberg |
| 5,793,964 A | 8/1998 | Rogers et al. |
| 5,802,312 A | 9/1998 | Lazaridis et al. |
| 5,809,415 A | 9/1998 | Rossmann |
| 5,810,680 A | 9/1998 | Lobb et al. |
| 5,831,679 A | 11/1998 | Montgomery et al. |
| 5,838,906 A | 11/1998 | Doyle et al. |
| 5,856,827 A | 1/1999 | Sudo |
| 5,862,348 A | 1/1999 | Pedersen |
| 5,867,662 A | 2/1999 | Riggs |
| 5,884,014 A | 3/1999 | Huttenlocher et al. |
| 5,884,056 A | 3/1999 | Steele |
| 5,893,095 A | 4/1999 | Jain et al. |
| 5,910,805 A | 6/1999 | Hickey et al. |
| 5,915,250 A | 6/1999 | Jain et al. |
| 5,923,736 A | 7/1999 | Shachar |
| 5,925,103 A | 7/1999 | Magallanes et al. |
| 5,928,324 A | 7/1999 | Sloan |
| 5,938,737 A | 8/1999 | Smallcomb et al. |
| 5,949,412 A | 9/1999 | Huntsman |
| 5,949,875 A | 9/1999 | Walker et al. |
| 5,956,716 A | 9/1999 | Kenner et al. |
| 5,961,586 A | 10/1999 | Pedersen |
| 5,961,603 A | 10/1999 | Kunkel et al. |
| 5,966,135 A | 10/1999 | Roy et al. |
| 5,974,441 A | 10/1999 | Rogers et al. |
| 5,978,835 A | 11/1999 | Ludwig et al. |

(Continued)

FOREIGN PATENT DOCUMENTS

| | | |
|---|---|---|
| EP | 0 889 402 A | 1/1999 |
| EP | 0 889 636 A | 1/1999 |
| EP | 890922 A2 | 1/1999 |
| EP | 1 001 613 A | 5/2000 |
| EP | 1043876 A2 | 10/2000 |
| WO | WO 97 30556 A | 8/1997 |
| WO | WO 97 38389 A | 10/1997 |
| WO | WO 98 40842 A | 3/1998 |
| WO | WO 98 43177 A | 10/1998 |
| WO | WO 99 09658 A | 2/1999 |
| WO | WO 0033232 A2 | 6/2000 |
| WO | WO 01 09836 A | 2/2001 |

OTHER PUBLICATIONS

Richard Han and John Smith, "Transcoding Of The Internet's Multimedia Content For Universal Access", Academic Press 2000 10 pages.*

Primary Examiner—Jack B. Harvey
Assistant Examiner—Hai V. Nguyen
(74) Attorney, Agent, or Firm—Blakely, Sokoloff, Taylor & Zafman LLP (57) ABSTRACT

The invention discloses a portable remote device that allows the user to access the Internet and World Wide Web. The portable device connects to a cellular telephone, thus providing wireless connection to the internet via a host computer which runs a browser, that takes information received from the Internet or other sources and renders it onto a virtual display in its memory. This information is directed to software, which reduces the color depth of the information to a lower depth color image. This reduced image is then compressed and encrypted by another software and sent to the portable device of the invention, which decrypts and decompresses it for displaying to the user. The browser may also reduces the color depth and compress the image without need for further software. Thus, the user views a bit map or raster image of a Web page, which is stored into memory. The portable device further comprises methods of pointing and clicking on text and images which represent links to other pages. Web pages with links may also be sent to the portable device, which stores them into memory to facilitate off-line viewing from the memory of the device. The user may also select desired links to each web page. Email messages may be retrieved manually or automatically at programmed times. Video frames and sound files may also be displayed on the portable device, with the aid of a buffer memory to facilitate uninterrupted playback.

24 Claims, 3 Drawing Sheets

U.S. PATENT DOCUMENTS

| | | |
|---|---|---|
| 5,987,256 A | 11/1999 | Wu et al. |
| 5,995,102 A | 11/1999 | Rosen et al. |
| 5,995,105 A | 11/1999 | Reber et al. |
| 6,003,065 A | 12/1999 | Yan et al. |
| 6,006,105 A | 12/1999 | Rostoker et al. |
| 6,006,231 A | 12/1999 | Popa |
| 6,006,241 A | 12/1999 | Purnaveja et al. |
| 6,008,836 A | 12/1999 | Bruck et al. |
| 6,011,546 A | 1/2000 | Bertram |
| 6,011,905 A | 1/2000 | Huttenlocher et al. |
| 6,012,083 A | 1/2000 | Savitzky et al. |
| 6,012,086 A | 1/2000 | Lowell |
| 6,014,133 A | 1/2000 | Yamakado et al. |
| 6,014,694 A | 1/2000 | Aharoni et al. |
| 6,014,706 A | 1/2000 | Cannon et al. |
| 6,016,535 A | 1/2000 | Krantz et al. |
| 6,021,409 A | 2/2000 | Burrows |
| 6,023,749 A | 2/2000 | Richardson |
| 6,026,435 A | 2/2000 | Enomoto et al. |
| 6,034,686 A | 3/2000 | Lamb et al. |
| 6,035,281 A | 3/2000 | Crosskey et al. |
| 6,047,047 A | 4/2000 | Aldridge et al. |
| 6,049,539 A | 4/2000 | Lee et al. |
| 6,049,821 A | 4/2000 | Theriault et al. |
| 6,049,831 A | 4/2000 | Gardell et al. |
| 6,052,130 A | 4/2000 | Bardon et al. |
| 6,054,985 A | 4/2000 | Morgan et al. |
| 6,057,857 A | 5/2000 | Bloomfield |
| 6,065,057 A | 5/2000 | Rosen et al. |
| 6,065,800 A | 5/2000 | Olson |
| 6,067,571 A | 5/2000 | Igarashi et al. |
| 6,072,483 A | 6/2000 | Rosin et al. |
| 6,073,168 A | 6/2000 | Mighdoll et al. |
| 6,073,483 A | 6/2000 | Nitecki et al. |
| 6,081,623 A | 6/2000 | Bloomfield et al. |
| 6,084,584 A | 7/2000 | Nahi et al. |
| 6,087,952 A | 7/2000 | Prabhakaran |
| 6,092,107 A | 7/2000 | Eleftheriadis et al. |
| 6,097,352 A | 8/2000 | Zavracky et al. |
| 6,101,180 A | 8/2000 | Donahue et al. |
| 6,104,392 A | 8/2000 | Shaw et al. |
| 6,105,021 A | 8/2000 | Berstis |
| 6,108,655 A | 8/2000 | Schleimer et al. |
| 6,108,727 A | 8/2000 | Boals et al. |
| 6,118,449 A | 9/2000 | Rosen et al. |
| 6,118,899 A | 9/2000 | Bloomfield et al. |
| 6,119,135 A | 9/2000 | Helfman |
| 6,121,970 A | 9/2000 | Guedalia |
| 6,138,156 A | 10/2000 | Fletcher et al. |
| 6,157,935 A | 12/2000 | Tran et al. |
| 6,182,054 B1 | 1/2001 | Dickinson et al. |
| 6,182,127 B1 | 1/2001 | Cronin, III et al. |
| 6,185,625 B1 | 2/2001 | Tso et al. |
| 6,192,393 B1 | 2/2001 | Tarantino et al. |
| 6,195,667 B1 | 2/2001 | Duga et al. |
| 6,219,465 B1 | 4/2001 | Nacman et al. |
| 6,225,984 B1 * | 5/2001 | Crawford .................... 345/173 |
| 6,226,400 B1 | 5/2001 | Doll |
| 6,256,750 B1 | 7/2001 | Takeda |
| 6,262,732 B1 | 7/2001 | Coleman et al. |
| 6,263,347 B1 | 7/2001 | Kobayashi et al. |
| 6,286,003 B1 | 9/2001 | Muta |
| 6,295,059 B1 | 9/2001 | Lentz et al. |
| 6,298,162 B1 | 10/2001 | Sutha et al. |
| 6,304,928 B1 | 10/2001 | Mairs et al. |
| 6,313,880 B1 | 11/2001 | Smyers et al. |
| 6,317,781 B1 | 11/2001 | De Boor et al. |
| 6,345,279 B1 | 2/2002 | Li et al. |
| 6,356,283 B1 | 3/2002 | Guedalia |
| 6,359,603 B1 | 3/2002 | Zwern |
| 6,404,416 B1 | 6/2002 | Kahn et al. |
| 6,411,275 B1 | 6/2002 | Hedberg |
| 6,433,801 B1 | 8/2002 | Moon et al. |
| 6,449,639 B1 | 9/2002 | Blumberg |
| 6,466,198 B1 | 10/2002 | Feinstein |
| 6,477,143 B1 | 11/2002 | Ginossar |
| 6,480,710 B1 | 11/2002 | Laybourn et al. |
| 6,535,743 B1 | 3/2003 | Kennedy, III et al. |
| 6,536,043 B1 | 3/2003 | Guedalia |
| 6,539,077 B1 | 3/2003 | Ranalli et al. |
| 6,564,250 B1 | 5/2003 | Nguyen |
| 6,571,245 B2 | 5/2003 | Huang et al. |
| 6,598,087 B1 | 7/2003 | Dixon, III et al. |
| 6,616,700 B1 * | 9/2003 | Thum et al. .............. 715/500.1 |
| 6,633,314 B1 * | 10/2003 | Tuli .......................... 345/744 |
| 2001/0034770 A1 | 10/2001 | O'Brien |
| 2002/0015042 A1 | 2/2002 | Robotham |
| 2002/0016801 A1 * | 2/2002 | Reiley et al. ................ 707/523 |
| 2002/0174010 A1 * | 11/2002 | Rice, III ...................... 705/14 |

OTHER PUBLICATIONS

J. Pasquale et al., "Improving Wireless Access To The Internet By Extending The Client/Server Model", University Of California San Diego, Dept. of Computer Science and Engineering, La Jolla, VA 92093–0114., 7 pages.*

International Search Report, PCT/US 01/03382, 1 pages, 2001.

International Search Report, PCT/CA 01/00114, 3 pages. 2001.

International Search Report, PCT/CA 01/00126, 3 pages, 2001.

International Search Report, PCT/CA 01/00170, 4 pages, 2002.

International Search Report, PCT/CA 01/00169, 3 pages, 2002.

International Search Report, PCT/CA 02/00048, 5 pages, 2003.

Tagawa Norio, "Data Relay System and Data Repeater Applied to the System", Patent Abstracts of Japan, vol. 1997, No. 10, Jun. 24, 1997.

Armando Fox et al, "Experience with Top Gun Wingman: a proxy–based graphical web browser fro the 3Com PalmPilot", *Middleware*, IFIP International Conference on Distributed Systems, Platforms and Open Distributed Processing, Sep. 1998, pp. 407–424.

Richard Han, et al., "Dynamic Adaptation in an Image Transcoding Proxy for Mobile Web Browsing", *IEEE Personal Communication*, Dec., 1998, pp. 8–17.

Timothy Bickmore, et al., "Web Page Filtering and Re–Authoring for Mobile Users", *The Computer Journal*, vol. 42, No. 6, 1999.

Tristan Richardson, Quentin Stafford–Fraser, Kenneth R. Wood & Andy Hopper, "Virtual Network Computing", *IEEE Internet Computing*, vol. 2 No. 1, Jan./Feb. 1998 pp33–38.

Citrix Systems, Inc.: "Citrix Announces New Product and Product Enhancements that Speed Web Application", http://www.citrix.com/press/news/releases/20000905_product_enhance.asp, Sep. 5, 2000.

Boutell, T. et al., "PNG (Portable Network Graphics) Specification Version 1.0", RFC 2083, pp. 1–102, Mar. 1997.

Halfhill, T.R., "Good–Bye GUI . . . Hello, NUI," BYTE Magazine, www.byte.com, vol. 22, No. 7, pp. 60–64, 66, 68, 70, and 72, Jul. 1997.

Masinter, L., "Returning Values from Forms: multipart/form–data," RFC 2388, pp. 1–9, Aug. 1998.

Jao, C.S. et al., "The display of photographic–quality images on the Web: a comparison of two technologies," IEEE Transactions on Information Technology In Biomediciene, vol. 3, iss. 1, pp. 70–73, Mar. 1999.

Kaljuvee, O. et al., "Efficient Web form entry on PDAs," ACM Proceedings of the tenth International Conference on WWW, ACM Press, ISBN: 1–58113–348–0, pp. 663–672, May 2001.

Oliphant, Malcom W. "The Mobile Phone Meets the Internet", *IEEE Spectrum*, vol. 36, Issue 8, Aug. 1999, pp. 20–28.

Lind, R., et al. "The Network Vehicle—A Glimpse into the Future of Mobile Multi–Media", *IEEE ASE Systems Magazine*, Sep. 1999, pp. 27–32.

Gbaguidi, Constant, et al. "A programmable Architecture for the Provision of Hybrid Services", *IEEE communications Magazine*, vol. 27, Issue 7, Jul. 1999, pp. 110–116.

Narayanaswamy, Shankar, et al. "User Interface for a PCS Smart Phone", *IEEE Int.. Conference on Multimedia Computing and Systems*, vol. 1 Jun. 1999, pp. 777–781.

Rumba Technical Bulletin, "Configuring Rumba LPR & LPD (16–bit)," 1996, from the web: 156.27.8.200/ts_rumba/solution/pdf/TCPIP/4002.pdf, pp. 1–11.

International Search Report, PCT/CA 02/00133, 3 pages, 2003.

International Search Report, PCT/CA 02/00048, 3 pages, 2003.

* cited by examiner

PRIOR ART

Figure 1

PRIOR ART

PRIOR ART

Figure 5

PORTABLE HIGH SPEED INTERNET ACCESS DEVICE WITH ENCRYPTION

PRIOR ART

The background of the present invention includes U.S. Pat. No. 5,925,103, Internet Access Device, which describes an improved Internet access system, vastly different from the present invention. Other prior art would include palm top computers and hand-held computers that have limited processing power due to design restrictions. Thus, these computers are much slower for accessing the Internet and World Wide Web.

The present invention enhances the host computer's processing speed, data transfer and retrieval to and from a portable hand held device, with the aid of specialized embedded software in the host computer. The result is a cost effective Internet access solution. The present invention also provides an encryption of the images sent from the host computer to the portable devices for a secured delivery of images. An entire web page with all associated links may be down loaded and stored into memory for future viewing when not connected to the host computer. The user may automatically or manually download email messages. Video and sound files may also be transferred from the Internet to the portable device via the host computer.

SUMMARY

It is an object of the present invention to disclose a portable device that can access the Internet and World Wide Web, at extremely low costs. It is another object of the present invention to provide a secured image transfer between the host computer and the portable device, with off line viewing capabilities.

The present invention discloses a portable device that connects to a cellular telephone. Thus, the device has a wireless connection to the Internet via a host computer that runs a browser, which takes information received from the Internet or other sources and renders it onto a virtual display in its memory. This information is directed to software, which reduces the color depth of the information to a lower depth color image. This reduced image is then compressed by another software and sent to the portable device of the invention, is for displaying to the user. Hence, the portable device receives the compressed image, decompresses it, stores it into memory, and displays it for view. Thus, the user views a bit map image of a Web page. Encryption may be applied at the host computer and decryption applied at the portable device to enable a secure delivery of images to the portable device.

In another instance, the browser itself may render the information onto a virtual display in its memory with a reduced color depth, and also compresses this reduced virtual display, which eventually gets sent to the portable device. This eliminates the need for other software to perform the same tasks.

The portable device may instruct the host computer to send a main web page from the Internet which may contain links to this web page. All the linked web pages may be sent with this main web page to be received and stored in the portable device, or the user may select which linked web pages are to be sent to the portable device. Detailed information on the active boxes representing link coordinates are also sent to the portable device to enable off-line viewing of the main web page and related linked pages from the memory of the portable device.

Email messages may be checked by clicking on an icon on the display screen of the portable device, whereby the portable device contains in its memory, web site addresses, user names and passwords to facilitate this operation. The device allows the user to select new incoming messages to be viewed or all email messages if desired. The device may be programmed to check for new email messages automatically at programmed times or intervals, disconnecting the cellular phone when the task is finished.

The host computer may send a web page, which contains a window displaying video frames. For continuous uninterrupted video display, the host computer would monitor and control the rate of frame transfer to the portable device and also the rate of frame display on the device. The portable device also contains a buffer memory which stores a reserve of frames, whereby the first frames stored are the first frames removed and displayed. Frames stored in buffer memory may be used to provide an uninterrupted display when there is a lag in frame transfer, due to poor communication between the host computer and the portable device. Should the transmission bandwidth suddenly decrease, the host computer may apply corrective measures to match the bandwidth by reducing the color depth of the images sent, or by dynamically adjusting the rate of frame transfer to the device in conjunction with the frame display rate on the device. Sound files may also be extracted from the Internet by the host computer and subdivided into smaller packets and sent in a similar fashion as video frames, stored in buffer memory prior to playing.

DETAILED DESCRIPTION OF THE DRAWINGS

The invention is described in more detail below with respect to an illustrative embodiment shown in the accompanying drawings in which.

DETAILED DESCRIPTION OF THE PRESENT INVENTION

To facilitate description, any numeral identifying an element in one figure will represent the same element in any other figure.

The principal embodiment of the present invention aims to provide a portable device that allows a user to access the Internet or the World Wide Web (WWW), which is a device similar to a portable computer. It is another aim of the present invention, to provide a method to develop a cost competitive device. It is a further aim of the present invention, to provide an encryption of the images sent from the host computer to the portable devices for a secured delivery of images.

Currently, existing portable devices such as the Palm Pilot VII and Windows CE type devices contain an operating system, and within the operating system a mini-browser to interpret information received from the WWW or Internet and then display this information on the screen. This requires a powerful microprocessor unlike the present invention.

Prior art of application Ser. No. 09/496,172 is disclosed in FIG. 1. A host computer 1 is depicted which is connected to the Internet, and that host computer receives information from outside in the form of HTML or JAVA or other formats, required to generate a web page. Running in the host computer, is a browser program 2 that takes all information received from outside and renders it onto a virtual display in its memory, hence a bitmap is made out of it. When a remote user 3 requests to view a Web page (or electronic message, etc.) a message is sent to the host computer 1 which receives HTML, JAVA, or other types of information from outside the computer (as information may be gathered from a variety of different sources) and the browser program 2 takes all information received from outside and renders it onto a virtual display in its memory. What is therefore rendered in the memory is a web page and this information is directed to another software 4, which reduces the color depth of the information (i.e. the entire image comprising graphics and text) which is usually received in 24 bit color, subsequently reduced to a black and white bit map or raster image, in the preferred embodiment. Even though text may appear in black and white, the entire image may be 24 bit color which is reduced to black and white. This reduced image is then compressed entirely using a loss-less method of compression by software 11, using G3 or G4 methods in the preferred embodiment. In a principle embodiment of the present invention, this to compressed image is then encrypted before it is sent through a port in the host computer 1, in the preferred embodiment, to the cellular telephone 12 of FIG. 1, which is connected to the portable high speed internet access device 18 of the invention. The portable device 18, which contains a display screen 20 with a transparent touch panel and related microelectronics, receives the compressed image, decrypts the image, decompresses it, stores it into internal memory, and displays it for viewing to the user 3.

Figure 1:
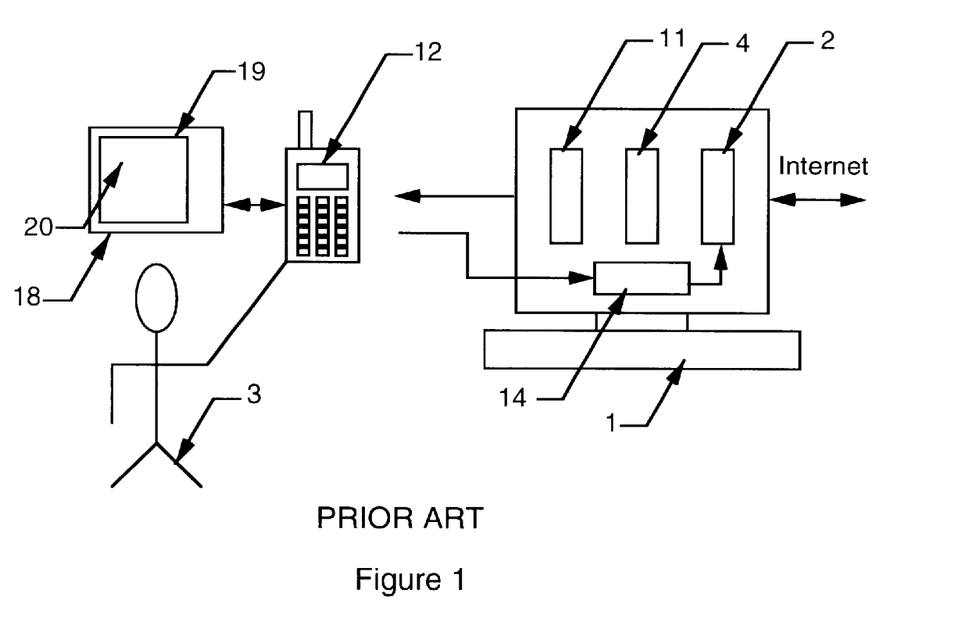
FIG. 1 illustrates elements in the host computer, which communicates with a remote user and the device of the invention, in accordance with prior art.

In another embodiment, the cellular phone 12 of FIG. 1 can be replaced by a wire less modem which is connected to the portable high speed internet access device 18 of the invention. This enables the portable device 18 to receive the compressed image, decrypt the image, decompresses it, store it into internal memory, and display it for viewing by the user 3.

In another embodiment, the cellular phone 12 of FIG. 1 can be replaced by a LAND line or PSTN which is connected to the portable high speed internet access device 18 of the invention. This enables the portable device 18 to receive the compressed image, decrypt the image, decompresses it, store it into internal memory, and display it for viewing by the user 3.

In another embodiment of the invention, the portable device 18, receives the compressed image, decrypts it, and stores the compressed decrypted image into internal memory. The image is decompressed prior to displaying for the user 3 when desired.

In other prior art, the browser program 2 takes information received from outside and renders it onto a virtual display in its memory, but not at the high depth of color as originally received. The browser 2 renders the image in a reduced depth of color, such as a black and white image, in the preferred embodiment. Hence, the software 4 is not required for reducing the color depth of the information as the browser program 2 also performs this task. In another embodiment of the present invention, this reduced image is then compressed and encrypted by the browser program 2 and sent to the portable high speed Internet access device 18 of the invention. The portable device 18, which contains a display screen 20 with a transparent touch panel and related microelectronics, receives the compressed image, decrypts the image, decompresses it, stores it into internal memory, and displays it for viewing to the user 3.

Prior Art does not permit a user to view emails or access links to other web pages from other portable devices, when the Internet connection is interrupted or terminated. In another embodiment of the invention, when the user requests to view a web page, a message is sent from the portable device to the host computer instructing it to get the main web page and compress the image of it and send it to the portable device. This main web page image is received by the portable device and stored in memory, subsequently decompressed prior to viewing. Like most web pages, this main web page may contain links such that by clicking on a link on the host computer, the user would be taken to a new web page which is displayed, and may also contain new links. Hence, there are other web pages linked to each link on the main web page. These links may appear in a different font or color on the main web page. When the user requests to view a web page and is viewing the main web page image on the portable device sent by the host computer, all the web pages that are linked to each link on the main web page are downloaded in the background and stored in internal memory, along with the location or coordinates of the active boxes representing where these links are on each web page, and also information pertaining to which links are linked to corresponding web pages. All this information is sent from the host computer to the portable device, and this is stored in internal memory on the device whilst the main web page is displayed. This is particularly useful to enable the user at a later time, when the portable device is not connected to the host computer via a cellular phone (i.e. the user is off-line), to view the main web page and click on links that appear on this web page on the display screen of the portable device, and view these linked web pages instantly, as the device knows which web page to go to since this information is already stored in the device. When the user clicks on one of the active boxes directly over a link on the portable device, it knows that a link is at this location as this information was sent by the host computer and is stored in memory. The linked web pages are also stored in the device in compressed format for immediate viewing without having to be sent from the host computer. When the user clicks on a link, the image that is already compressed and stored in memory associated with that particular link gets decompressed and is displayed for viewing.

In another embodiment, the only web pages linked to the main web page that are downloaded and stored in the portable device are the most popular or frequently visited web pages. This would streamline the amount of data stored in the portable device thereby increasing its storage capacity.

In a further embodiment of the invention, the device contains a method by which the user is able to instruct whether a first level, second level or multi levels of linked web pages are to be downloaded from the main web page. In particular, the first level of linked web pages refers to web pages linked directly to the main web page, as these are represented by the links that appear on the main web page. Similarly, the second level of linked web pages refers to web pages linked directly to the web pages in the first level of linked web pages. Likewise, multi levels of linked web pages follow the same link format. This would also streamline the amount of data stored in the portable device thereby increasing its storage capacity, and provide more useful information to the user's preference.

In a further embodiment of the invention, when the host computer is connected to the Internet and has also established connection with the portable device, the user may log on to an email system such as Microsoft's Hotmail or another system. The user gets a main email web page sent from the host computer, which typically has a list of all email messages, represented by links, to be stored and displayed on the portable device. The device contains a method by which the user is able to instruct whether all email messages are to be downloaded or only newly received emails are to be downloaded and stored in memory on the portable device, thus establishing different levels of email messages. Hence, the user may program the device so that the device knows which linked pages to download, in particular which level of email messages to download, as only new incoming messages may be preferred over all saved messages. In particular, the user has the option not to select all the links to the main email web page subsequently down loaded on the portable device, thus constituting a partial first level of email downloading, as certain linked pages to the main email web page may not be required or desired to be stored into memory on the portable device, thus conserving memory.

Automated features may also be implemented by the portable device such as turning on at desired times, connecting to the host computer and downloading all programmed web page searches with all selected linked web pages as programmed on the portable device, and shutting off automatically when the task is completed. Similarly, all new email messages may be checked once an hour or at other times automatically by programming the portable device to connect to the host computer and downloading all new email messages, and shut off automatically afterwards. Outgoing email messages previously generated off-line on the portable device and stored in memory may also be sent when a connection is established to the host computer at a later time. A designated icon on the screen of the device may also be programmed with web page addresses, user names and passwords in memory. When the user clicks on this icon, the portable device establishes a connection to the host computer if not already connected, and the device inserts this pre-programmed information in that web page in the host computer, and a new main web page appears with all links to that web page, which are all downloaded in the portable device and stored into memory. This enables the user to check for new email messages at the touch of an icon and the results can be viewed at a later time off-line. There is only a minor difference in downloading a web page search result compared to checking email messages, whereby most of the links are downloaded in the web page search, and only a few selected links are downloaded in checking email messages.

Figure 2:
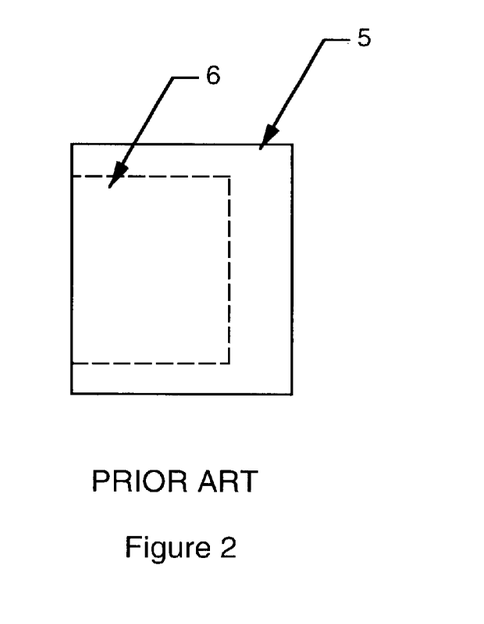
FIG. 2 illustrates the image to be displayed compared with the displayable area of a browser window, in accordance with prior art.

In prior art the image 5, as shown in FIG. 2, contains the information that would normally be displayed on a single Web page. As can be seen in FIG. 2, the image 5 of the web page that is rendered by the browser 2 onto a virtual display in the memory is usually larger than the virtual window 6 of the browser. The entire image 5 of the web page is sent to the portable device 18, to be displayed. The window 6 of the browser 2 running in the host computer 1 is set to be the same size as the display window 19 of the portable device 18, because the portable device's display window is small, and most likely the web page is larger than the window of the browser in the host computer. The reason for setting the browser's window to be the same size as the portable device's window is for formatting purposes, so that text can be formatted to comfortably fit the size of the web page to be better displayed. In the preferred embodiment of the invention, the entire web page which is much larger than both the browser's window and the portable device's window, is rendered onto a virtual display in memory by the browser 2 in the host computer 1, the color depth reduced, and the image compressed and sent to the portable device. The portable device receives this image, decompresses it, stores it into memory and displays it to the user.

A CPU resident in the portable device 18 therefore has the ability to decompress a bit map or raster image that may be larger than the size of the display and allow the user to traverse this bit map or raster image on the portable device. The primary method of traversing the image is through conventional scroll bars positioned at the sides of the image. However, buttons or icons may also be used to scroll on the portable device, to enable the user to move the web page relative to the display of the portable device. The CPU present in the portable device performs all scrolling functions, even though messages are sent to the host computer informing it of each scroll instruction. This allows the host computer to keep a track of the location of the portable device's display screen with respect to the web page.

Figure 4:
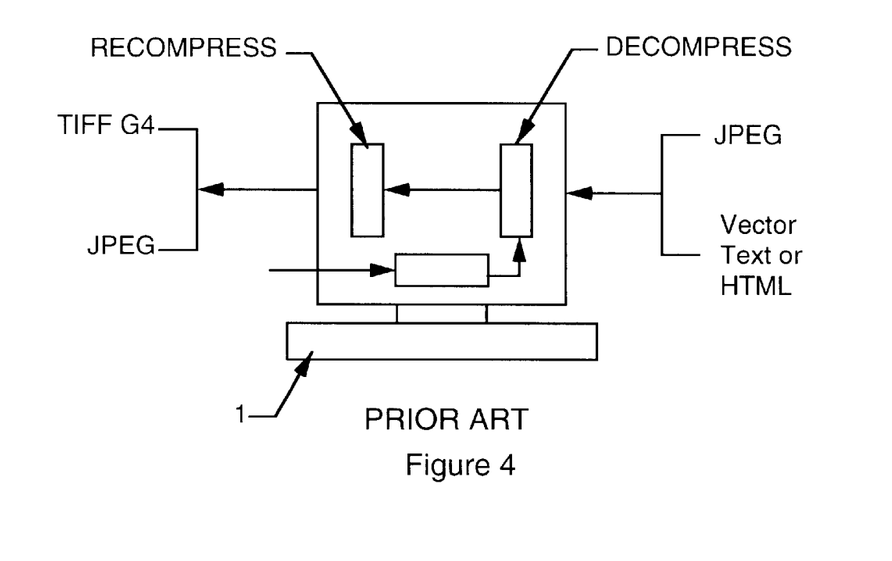
FIG. 4 illustrates file formats received and sent by the host computer, in accordance with prior art.

The host computer receives vector information or compressed data from outside in the form of HTML, JPEG, etc., which is displayed on a web page. That image, in whole or parts, is recompressed and sent to the portable device. The recompressed data format sent to the portable device, is not necessarily in the same format as the compressed data format first received by the host computer, as illustrated in FIG. 4. For example, the incoming data from a Web page may be in the form of JPEG which is decompressed and displayed on the browser 2. This data is recompressed and sent to the portable device but can be in the form of TIFF G4 or other formats, and not necessarily JPEG as initially received.

Another embodiment involves the host computer receiving vector information such as HTML or text and then rasterizing it to bit map format. It can then shown in memory through the virtual browser and is recompressed through a "loss less" method and sent to the portable device.

Figure 3:
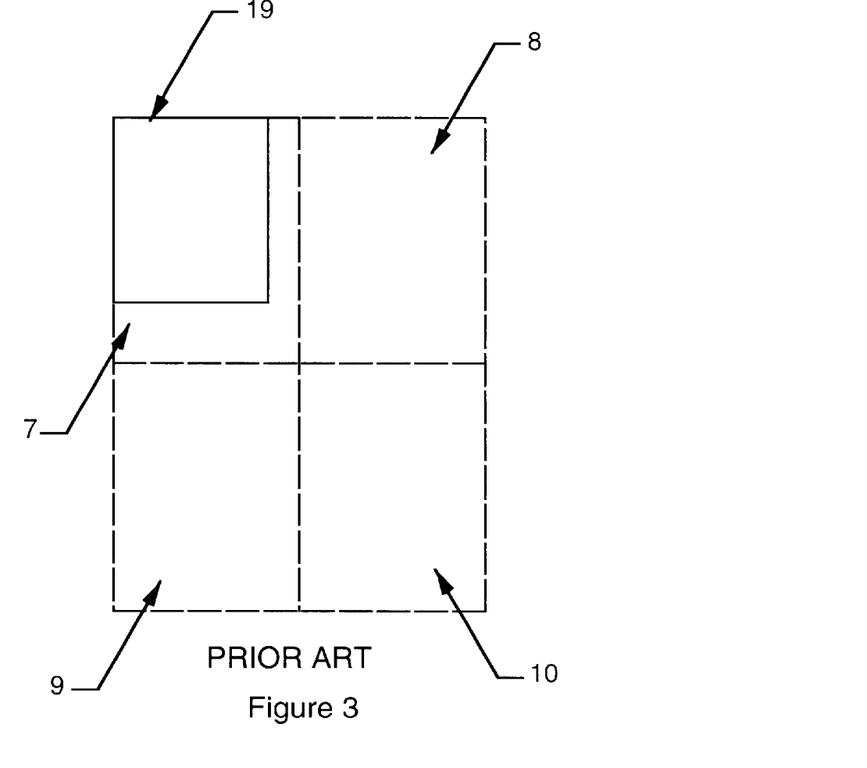
FIG. 3 shows a typical subdivision of the image to be displayed, in accordance with prior art.

The image 5 is further divided into sections 7, 8, 9, and 10, as shown in FIG. 3. The image is divided after the bitmap or raster is created. The reason for the division (as will be explained later) is for the purpose of display priority on the user's display. The image 5 is then sent to another program 11 running on the host computer 1 (FIG. 1), which compresses the image using a loss-less compression method. The compression method may be group 3 or group 4, or another method. The information is received by a portable device 18 that has the ability to display a monochrome image, in its display window 19. The information is decompressed and displayed in the order of priority such that part of image 7, which substantially or completely covers the displayable area 19 of the portable device, is decompressed and displayed first and then sequentially the portions 8, 9, 10 of the image are decompressed and stored in an internal memory of the portable device to be displayed later when the user scrolls up, down, or sideways to these parts of the image.

The resident CPU on the portable device has no ability to determine which parts part or parts of the image, that is being displayed, represent links to other Web pages etc. Thus, the browser 2 (FIG. 1) renders the image in the virtual window 6 of the browser, such that the words that represent links on the image 5 of the web page (FIG. 2) are translated to be slightly bolder or the font changed. The user may therefore consider text that is bold or another color or font to be links.

The portable device provides the user with a pointing device. This pointing device may be a touch screen or tracking ball, etc. The portable device also allows the user to click on specified areas. As soon as the user clicks on part of an image, the shape of the pointer changes from an arrow to an hourglass. This operation is performed by the CPU of the portable device. A message is sent to the host computer, transmitting the location of the clicked down event. A program 14 interprets the message and provides a virtual click down in the browser 2. If the user has pressed in an area of the image that does not represent a link or text box, a message is dispatched to the portable device which immediately changes the hourglass shape of the pointer back to an arrow (in the case of a touch screen, from an hour glass to nothing). Further to this, if is the user has clicked on a part of the image which represents a link, a new Web page is extracted from the Internet or WWW, rendered onto a virtual display in memory by the browser 2 in the host computer 1, the color depth reduced, and the image compressed and sent to the portable device. The portable device receives this image, decompresses it, stores it into memory and displays it to the user.

Figure 5:
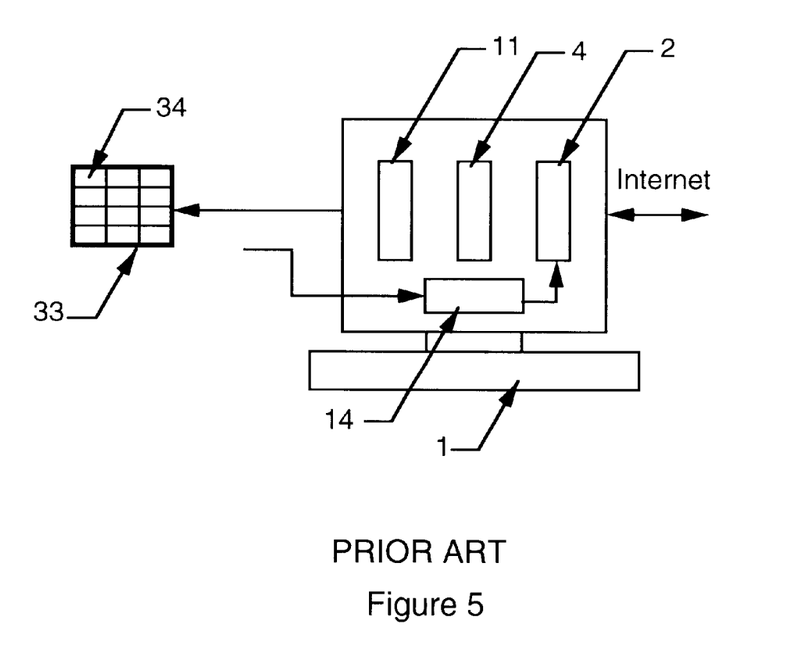
FIG. 5 illustrates the host computer transmitting a video frame captured by the Browser, in accordance with prior art.

In other prior art, the browser program 2 in the host computer 1 captures voice and video along with the conventional virtual image to be transmitted to the portable device, as illustrated in FIG. 5. Video on the Internet runs at slower speeds than conventional video, and for demonstration purposes we can assume Internet video runs at 16 frames per second. Since the allowable bandwidth to transmit images, voice and video may not be adequate to transmit video at 16 frames per second and is only enough for 4 frames per second, therefore, the browser extracts 4 video frames per second and transmits each frame to the portable device. Once a frame 33 is captured, it is subdivided into smaller blocks 34, compressed, and then transmitted in sequence to the portable device by a modem in the host computer 1. Since there are 16 frames per second, the browser must capture every fourth frame, subdivide each frame and send this to the portable device. The entire frame must be captured, otherwise sending four times per second over an interval of four frames from a moving video image, will result in parts of three frames appearing in every fourth frame, giving an erroneous display. Hence, the fourth, eighth, twelfth and sixteenth frames are captured, subdivided and sent to the portable device. Each transmitted frame 33 received by the portable device has its blocks assembled in correct sequence, decompressed, and then displayed also at a rate of 4 frames per second, with every fourth frame displayed.

In accordance with the present invention, to ensure a continuous video display without interruption, buffering of the video frames is done at the portable device or at the cellular phone connected to the portable device. The portable device would instruct the host computer to get a particular web page, which appears and shows video in a window or a new window appears for video display. Multiple frames of graphics would be coming in from the Internet, and the host computer would play this video in its internal memory. The host computer communicates with the portable device and informs it that the information it is about to receive is a sequence of video frames. The host computer also sends a message to the portable device or cellular phone instructing it to buffer or stack the incoming video frames in memory before showing them. This is eventually displayed in a dedicated window for video on the portable device. The portable device then receives instructions from the host computer informing of how many frames are being sent, at what interval to show each frame, and when to commence showing the sequence of video frames after buffering has started. Buffering must commence prior to showing the sequence of video frames, as the rate of video frame transfer from the host computer to the cellular phone may be slower than the designated rate of frame display on the portable device once in a while, due to a lag in cellular phone communication or a brief interruption in the communication line. Video frames are stacked into memory on the portable device, for example 30 frames may be stored in memory before the device commences playing video. If there is a lag in the in cellular phone communication or a brief interruption, the device uses up some of the 30 frames to continue displaying frames at a constant rate without interruption until previous communication conditions resume, whereby the buffer is filled back with 30 frames. Hence, it may take as much as ten minutes to download and play two minutes of video, but employing buffering would ensure a continuous video display at a designated frame display rate. The entire video does not have to be buffered first before commencing the display on the portable device, as the host computer can determine at which time video display may commence, upon which a command is sent to the portable device, with buffering occurring simultaneously. The host computer sends and receives messages to and from the portable device and always knows how much buffer memory is present in the portable device from the beginning to end of video display. Buffering acts as a First In First Out (FIFO) memory device whereby the first frames stored are the first to be displayed on the portable device, and also the first to be removed from memory to create space for the new frames to be sent to the portable device. Hence, the host computer can monitor the rate of data transfer to the portable device, which may depend on the capacity of the communication line along with the available bandwidth, and consequently determine at which point video is to commence playing in the dedicated window on the portable device to ensure a continuous frame display rate without interruption, at a designated frame display rate. The portable device would start playing video frames in correct sequence, even though they may not necessarily be received in playback sequence, but each video frame has an identifier to enable playback in proper sequence. As video frames are retrieved and removed from memory, new frames are received and stored into buffer memory on the portable device, at a rate such that an uninterrupted playback may be featured. The host computer will try to match the bandwidth as it knows the bandwidth of the portable device it is transmitting to, and also the type of display whether it is color or black and white. This determines the type of video that will be sent to the portable device for display. Hence, if the portable device does not have a color display, the host computer may only send a gray scale or black and white image to reduce the bandwidth of transmission. This would increase the frame display rate on the portable device to an extent. However, if the available bandwidth is only capable of transmitting 4 frames per second, then the host computer will send slightly less, say 3½ frames per second so that the portable device may receive a steady supply frames to store in buffer memory, to compensate for any interruptions in frame transfer to the portable device. The status of available buffer space is transmitted from the portable device to the host computer at frequent intervals, so that the host computer may know this at all times. Hence, when the buffer is full, the host computer only sends frames when sufficient space becomes available in the device's memory. The display rate may also be automatically adjusted to compensate for a large drain in the buffer due to a sudden reduction in the available bandwidth as a result of a cellular line interruption. When the bandwidth is reduced, the host computer knows this as it detects a depletion in the available buffer space and it also knows how many frames the device is receiving and can determine that this is not enough to fill the buffer and continue displaying frames at the present rate. Hence, the host computer can dynamically reduce the number of frames per second that it sends to the device based on the available bandwidth, and consequently instructs the device to display frames at a slightly slower rate than the rate it transfers frames to the device. This gives the buffer a chance to fill up and not have a constant depletion without being able to replenish its reserve.

In another embodiment of the invention, the color depth of the video frames may be reduced to compensate for any reduction in bandwidth, resulting in an increased depletion of frames in the buffer. The host computer may reduce the color depth from 8 bit color to 4 bit or gray scale. This will allow more video frames to be transmitted across a reduced bandwidth to be displayed on the portable device, thus allowing the buffer sufficient opportunity to be replenished, without having to reduce the frame display rate.

In a typical video transmission in accordance with the present invention, the main web page gets sent first from the host computer to the portable device, and video frames may be transferred automatically or manually by the user clicking on an icon, which results in video playing in a window on the portable device. When video frames are sent to the portable device, only the image in the window displaying these video frames gets refreshed with new video frames. The background however, also gets refreshed at a less frequent rate than the window displaying video frames, and a refreshed background image is time sliced with video frames being sent from the host computer to the portable device. This is necessary, as the video display window may not occupy the full area of the display screen, leaving a background portion of the web page visible. Hence, after a few frames of video are sent from the host computer, a refreshed background image would be sent with more video frames following. This sequence of time slicing refreshed background images is repeated throughout the display of video frames. The portable device receives video frames with refreshed background images and recognizes that the refreshed background images are different from the video frames, and accordingly displays the newly received background images.

In another embodiment of the present invention, sound files may also be sent from the host computer to the portable device to be heard at remote locations. After receiving commands to retrieve a sound file, the host computer sends a message to the portable device that it is about to receive a sound file to be sent as a series of smaller compressed sound packets. The host computer sends and receives messages to and from the portable device and always knows how much buffer memory is present in the portable device, and sends a message to the portable device to start buffering the incoming sound packets. Based on the file size, sound packet size, data transfer rate and available buffer memory, the host computer decides when the portable device may start playing the sound file whilst buffering is occurring simultaneously. The portable device would start playing sound packets in correct sequence, even though they may not necessarily be received in playback sequence, but each sound packet has an identifier to enable playback in proper sequence. As sound packets are retrieved and removed from memory, new sound packets are received and stored into memory on the portable device, at a rate such that an uninterrupted playback may be featured.

In another embodiment of the invention, information from adjacent video frames is used to enhance the quality of each video frame sent from the host computer to the portable device. This may be necessary as video on the Internet could run at 16 frames per second, but when video frames are transferred from the host computer and displayed on the portable device at approximately 4 frames per second, there may be significant frame quality degradation. Hence, information is taken from adjacent frames before and after each selected frame to be sent from the host computer, and this information is compiled and processed in the host computer to improve the picture quality of the video frame before it is sent to the portable device.

In a further embodiment of the invention, it may be preferable to limit the amount of data that is transferred from the host computer to the portable device in order to reduce the cost of operating, as some cellular phone carriers or network services and wireless modems charge for the amount of data transferred. In the preferred embodiment, the host computer limits the size of the primary web page first sent to the portable device to approximately 640×800 dots, as the majority of information contained in most web pages lies within this area. If the user scrolls outside this primary page area or gets close to the boundaries of this area, then the host computer would send information about the new adjacent area to the portable device, which downloads and stores it into the same memory adjacent to the primary page area whilst displaying to the user.

In another embodiment of the invention, the host computer only sends information to the portable device equivalent in size to the display screen area including a small zone around this area. If the user scrolls beyond this first area sent to the portable device to a new area or gets close to the boundaries of this area, then the host computer would send information about the new adjacent area to the portable device, which downloads and stores it into the same memory adjacent to the first area whilst displaying to the user. This method may be slower than other methods and is ideal for preliminary screening, and since most of the web page is not sent, this increases the storage capacity of the portable device and also limits the amount of data transferred from the host computer to the portable device.

In a further embodiment of the invention, the portable device would be equipped with a standard mouse or roller ball. A standard arrowhead or pointer would appear on the display screen of the portable device to indicate the location of the mouse or roller ball. The effects of a typical web page containing links and the arrowhead or pointer changing shape when placed over a link to another web site are simulated herein. When the user requests to view a web page, the host computer does not only send the web page as an image, but also sends the area locations of all active boxes which may appear darker or of a different font or color on the display screen. These active boxes usually represent links to other web pages. Hence, placing the arrowhead or pointer over any active box would result in its shape changing to a hand or another symbol, which is done by the portable device which knows where the arrowhead or pointer is at all times in relation to the active boxes. Clicking over an active box would result in a message being sent from the portable device to the host computer instructing the retrieval of the corresponding linked web page, and sending it to the portable device for storage into memory and displaying to the user.

What is claimed:

1. A host computer which receives information from outside, contains a browser which renders this information onto a virtual display in its memory, whereby a software program reduces the color depth of the rendered virtual display, compresses this reduced virtual display, which is encrypted and sent to a remote device capable of receiving, decrypting, decompressing, storing into memory and displaying it to a user.

2. A host computer which receives information from outside, contains a browser which renders this information onto a virtual display in its memory with a reduced color depth, compresses this reduced virtual display, encrypts it and sends it to a remote device which is capable of receiving, decrypting, decompressing, storing into memory and displaying it to a user.

3. A host computer which receives information from outside, contains a browser which renders this information onto a virtual display in its memory, whereby a software program reduces the color depth of the rendered virtual display, compresses this reduced virtual display, which is sent to a remote device capable of receiving, decompressing, storing into memory and displaying it to a user.

4. A host computer which receives information from outside, contains a browser which renders this information onto a virtual display in its memory with a reduced color depth, compresses this reduced virtual display, and sends it to a remote device which is capable of receiving, decompressing, storing into memory and displaying it to a user.

5. A device as claimed in claims 1 or 2 such that the user can instruct an image of a main web page to be sent from the host computer to be displayed on the remote device, whereby images of other web pages linked to the main web page are also received and stored in memory on the remote device, along with information indicating the locations on the main web page where the user clicks to retrieve images of other linked web pages.

6. A device as claimed in claims 3 or 4 such that the user can instruct an image of a main web page to be sent from the host computer to be displayed on the remote device, whereby images of other web pages linked to the main web page are also received and stored in memory on the remote device, along with information indicating the locations on the main web page where the user clicks to retrieve images of other linked web pages.

7. A device as claimed in claims 1 or 2 such that when an image is sent from the host computer to the remote device, the information about active areas on the image representing the location of links to other web pages is also sent to the remote device, whereby as the user moves a cursor or a pointing device over active areas on a display screen of the remote device, it graphically informs the user of the presence of said active areas.

8. A device as claimed in claims 3 or 4 such that when an image is sent from the host computer to the remote device, the information about active areas on the image representing the location of links to other web pages is also sent to the remote device, whereby as the user moves a cursor or a pointing device over active areas on a display screen of the remote device, it graphically informs the user of the presence of said active areas.

9. A device as claimed in claims 1 or 2 such that the user can click on an icon on a display screen of the remote device, which sends a message to the host computer to automatically send a set of web pages to the remote device that includes a first page and pages linked to the first page, along with information indicating the locations on the main web page where the user clicks to retrieve linked web pages.

10. A device as claimed in claims 3 or 4 such that the user can click on an icon on a display screen of the remote device, which sends a message to the host computer to automatically send a set of web pages to the remote device that includes a first page and pages linked to the first page, along with information indicating the locations on the main web page where the user clicks to retrieve linked web pages.

11. A device as claimed in claims 1 or 2 such that the remote device contains user names, passwords and addresses stored in memory to automatically instruct the host computer at programmed times to retrieve email messages from outside, which are sent to the remote device as a main email web page with other web pages linked to the main email web page, each representing new messages, for storage and displaying to the user at any time.

12. A device as claimed in claims 3 or 4 such that the remote device contains user names, passwords and addresses stored in memory to automatically instruct the host computer at programmed times to retrieve email messages from outside, which are sent to the remote device as a main email web page with other web pages linked to the main email web page, each representing new messages, for storage and displaying to the user at any time.

13. A device as claimed in claims 1 or 2 such that the host computer receives video frames and uses a software program to display those video frames in a virtual memory, whereby certain video frames are extracted from said virtual memory by the host computer and sent to the remote device which contains a buffer memory, such that the remote device inserts these video frames in the buffer memory and displays these frames, sending information back to the host computer on the status of its buffer memory, whereby based on said status, the host computer may change the rate of extracting and sending video frames to the remote device.

14. A device as claimed in claims 3 or 4 such that the host computer receives video frames and uses a software program to display those video frames in a virtual memory, whereby certain video frames are extracted from said virtual memory by the host computer and sent to the remote device which contains a buffer memory, such that the remote device inserts these video frames in the buffer memory and displays these frames, sending information back to the host computer on the status of its buffer memory, whereby based on said status, the host computer may change the rate of extracting and sending video frames to the remote device.

15. A device as claimed in claims 1 or 2 such that the host computer receives video frames and uses a software program to display those video frames in a virtual memory, whereby certain video frames are extracted from said virtual memory by the host computer and sent to the remote device which contains a buffer memory, such that the remote device inserts these video frames in the buffer memory and displays these frames, sending information back to the host computer on the status of its buffer memory, whereby based on said status, the host computer may change the color depth of video frames sent to the remote device.

16. A device as claimed in claims 3 or 4 such that the host computer receives video frames and uses a software program to display those video frames in a virtual memory, whereby certain video frames are extracted from said virtual memory by the host computer and sent to the remote device which contains a buffer memory, such that the remote device inserts these video frames in the buffer memory and displays these frames, sending information back to the host computer on the status of its buffer memory, whereby based on said status, the host computer may change the color depth of video frames sent to the remote device.

17. A device as claimed in claims 1 or 2 such that when a web page containing a window which displays video frames is sent to the remote device, only the window which displays video frames is refreshed constantly with new video frames on the remote device, with the visible background portion of the web page periodically refreshed at a lesser rate than the video frames.

18. A device as claimed in claims 3 or 4 such that when a web page containing a window which displays video frames is sent to the remote device, only the window which displays video frames is refreshed constantly with new video frames on the remote device, with the visible background portion of the web page periodically refreshed at a lesser rate than the video frames.

19. A device as claimed in claims 1 or 2 such that when a web page containing a window which displays video frames is sent to the remote device, each video frame transmitted to the remote device is enhanced in display quality by the host computer, which compiles information from adjacent video frames before and after each transmitted video frame.

20. A device as claimed in claims 3 or 4 such that when a web page containing a window which displays video frames is sent to the remote device, each video frame transmitted to the remote device is enhanced in display quality by the host computer, which compiles information from adjacent video frames before and after each transmitted video frame.

21. A device as claimed in claims 1 or 2 such that the host computer receives sound files and uses a software program to run those sound files in a virtual memory, whereby these sound files are subdivided and extracted from said virtual memory by the host computer and sent to the remote device which contains a buffer memory, such that the remote device inserts these sound files in the buffer memory and plays these files, sending information back to the host computer on the status of its buffer memory, whereby based on said status, the host computer may change the rate of extracting and sending sound files to the remote device.

22. A device as claimed in claims 3 or 4 such that the host computer receives sound files and uses a software program to run those sound files in a virtual memory, whereby these sound files are subdivided and extracted from said virtual memory by the host computer and sent to the remote device which contains a buffer memory, such that the remote device inserts these sound files in the buffer memory and plays these files, sending information back to the host computer on the status of its buffer memory, whereby based on said status, the host computer may change the rate of extracting and sending sound files to the remote device.

23. A device as claimed in claims 1 or 2 whereby the host computer limits the image size to be displayed on a screen of the remote device equivalent in size or larger than the display screen, such that when the user scrolls to a boundary of the image on the remote device, the host computer sends information about the adjacent area to said boundary which is received and stored in the remote device for displaying to the user.

24. A device as claimed in claims 3 or 4 whereby the host computer limits the image size to be displayed on a screen of the remote device equivalent in size or larger than the display screen, such that when the user scrolls to a boundary of the image on the remote device, the host computer sends information about the adjacent area to said boundary which is received and stored in the remote device for displaying to the user.

* * * * *